(12) United States Patent
Wilcox

(10) Patent No.: US 10,499,037 B1
(45) Date of Patent: Dec. 3, 2019

(54) ACTIVE ALIGNMENT OF STEREO CAMERAS

(71) Applicant: Amazon Technologies, Inc., Seattle, WA (US)

(72) Inventor: Scott Michael Wilcox, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 235 days.

(21) Appl. No.: 14/724,669

(22) Filed: May 28, 2015

(51) Int. Cl.
*H04N 13/246* (2018.01)
*H04N 5/225* (2006.01)
*H04N 13/243* (2018.01)

(52) U.S. Cl.
CPC ......... *H04N 13/246* (2018.05); *H04N 5/2251* (2013.01); *H04N 13/243* (2018.05)

(58) Field of Classification Search
CPC ...... G02B 2027/014; G02B 2027/0138; G02B 6/2551; B64C 39/024; B64C 2201/123; B64C 2201/127; B64C 27/04; B64C 2201/042; B64C 2201/108; B64C 27/08; H04N 13/0203; H04N 13/0242; H04N 5/2253; G06T 2207/10012; G06T 2207/10032; G06T 2219/20; G01B 3/002; G01S 17/08; G01H 9/00; G01H 3/00; G01M 7/025
USPC ................... 348/47, 117, 144, 147; 382/104; 385/97; 356/400, 4.01, 496; 324/96; 702/39
See application file for complete search history.

(56) References Cited

U.S. PATENT DOCUMENTS

| | | | | |
|---|---|---|---|---|
| 4,730,928 A | * | 3/1988 | Gabriel | G01B 3/002 356/400 |
| 4,911,522 A | * | 3/1990 | Iwamoto | G02B 6/2551 385/97 |
| 5,571,969 A | * | 11/1996 | Kawasaki | B64G 1/22 73/514.26 |

(Continued)

FOREIGN PATENT DOCUMENTS

| | | | | |
|---|---|---|---|---|
| DE | 102013017341 A1 | * | 6/2014 | ......... H04N 5/23258 |
| WO | WO-03019113 A1 | * | 3/2003 | ............. G01B 11/16 |

OTHER PUBLICATIONS

Nathaniel J. Short, "3-D Point Cloud Generation from Rigid and Flexible Stereo Vision Systems." Master's thesis, Virginia Polytechnic Institute and State University, 2009.*

(Continued)

*Primary Examiner* — Gims S Philippe
*Assistant Examiner* — Daniel Chang
(74) *Attorney, Agent, or Firm* — Kilpatrick Townsend & Stockton LLP

(57) ABSTRACT

In some examples, an unmanned aerial vehicle (UAV) may include a stereo camera including two cameras. To maintain proper alignment of the stereo camera as the UAV moves about, a management device may access calibration information for the stereo camera and receive sensing information indicating movement of the two cameras relative to each other. Based at least in part on the calibration information and the sensing information, the management device may instruct an actuator to move one of the two cameras to the proper alignment or may rectify frames captured by the two cameras to return to the proper alignment.

19 Claims, 10 Drawing Sheets

(56) References Cited

U.S. PATENT DOCUMENTS

| | | | | |
|---|---|---|---|---|
| 6,505,130 B1* | 1/2003 | Springer, III | ............ | G01H 3/00 |
| | | | | 702/39 |
| 8,576,143 B1* | 11/2013 | Kelly | ................... | G02B 27/017 |
| | | | | 345/8 |
| 2002/0024331 A1* | 2/2002 | Lewis | ..................... | G01H 9/00 |
| | | | | 324/96 |
| 2002/0135748 A1* | 9/2002 | LaPolice | ............... | G01S 7/4813 |
| | | | | 356/3.05 |
| 2004/0125378 A1* | 7/2004 | Selbach | ................ | G01M 7/025 |
| | | | | 356/496 |
| 2008/0297000 A1* | 12/2008 | Nishiyama | ............... | G02B 7/08 |
| | | | | 310/323.02 |
| 2010/0079101 A1* | 4/2010 | Sidman | ................ | F16M 11/041 |
| | | | | 318/649 |
| 2013/0128000 A1* | 5/2013 | Ko | ..................... | H04N 13/0239 |
| | | | | 348/47 |
| 2013/0301049 A1* | 11/2013 | Teague | ............... | B64D 45/0005 |
| | | | | 356/400 |
| 2016/0116277 A1* | 4/2016 | Lai | .......................... | G01S 17/08 |
| | | | | 356/4.01 |

OTHER PUBLICATIONS

F. Andert, N. Ammann, J. Püschel, J. Dittrich, "On the safe navigation problem for unmanned aircraft: Visual odometry and alignment optimizations for UAV positioning", International Conference on Unmanned Aircraft Systems (ICUAS), pp. 734-743, 2014.*

* cited by examiner

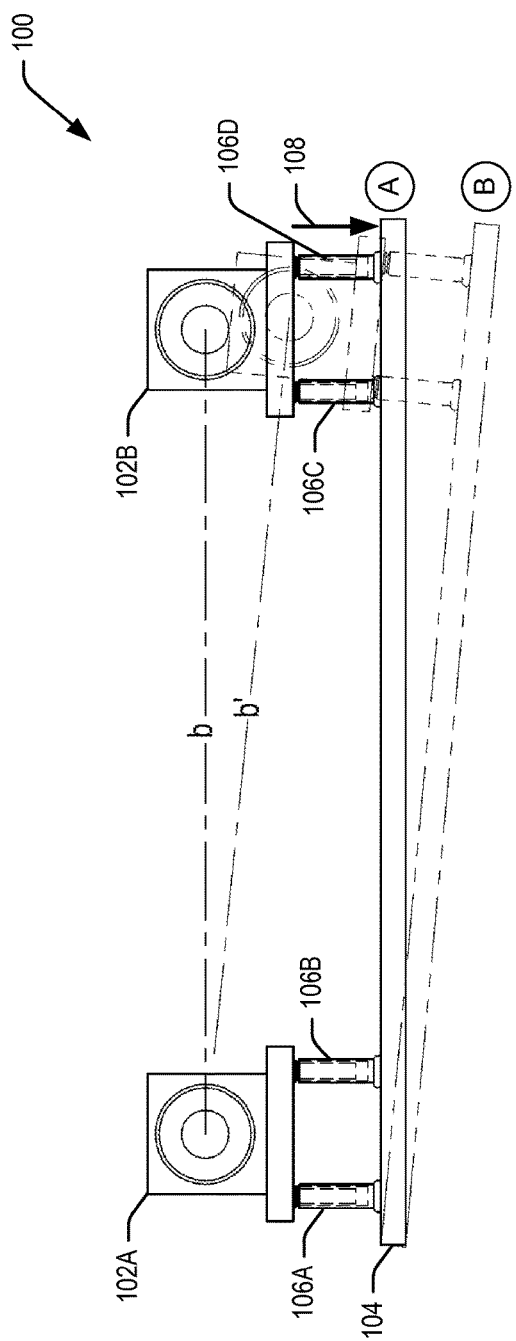
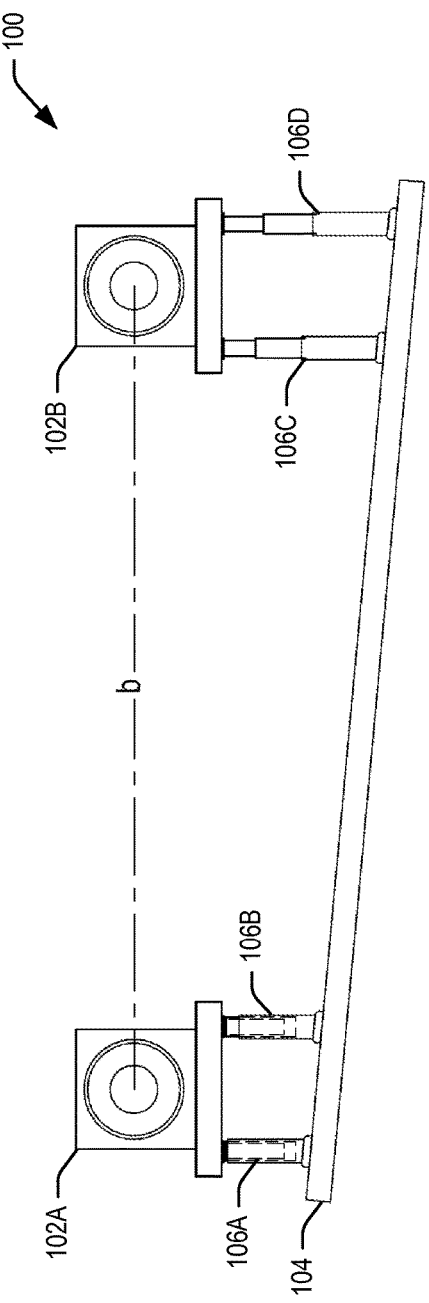

ACTIVE ALIGNMENT OF STEREO CAMERAS

BACKGROUND

Stereo cameras may be configured to simulate human binocular vision. To this end, some stereo cameras may include two or more lenses, each with its own separate image sensor. Because of this, stereo cameras may be able to capture three-dimensional images, which may enable detection of objects in a three-dimensional world.

BRIEF DESCRIPTION OF THE DRAWINGS

Various embodiments in accordance with the present disclosure will be described with reference to the drawings, in which:

FIG. 1 is an example assembly corresponding to techniques relating to alignment of stereo cameras as described herein, according to at least one example;

FIG. 2 is an example assembly corresponding to techniques relating to alignment of stereo cameras as described herein, according to at least one example;

DETAILED DESCRIPTION

Figure 3:
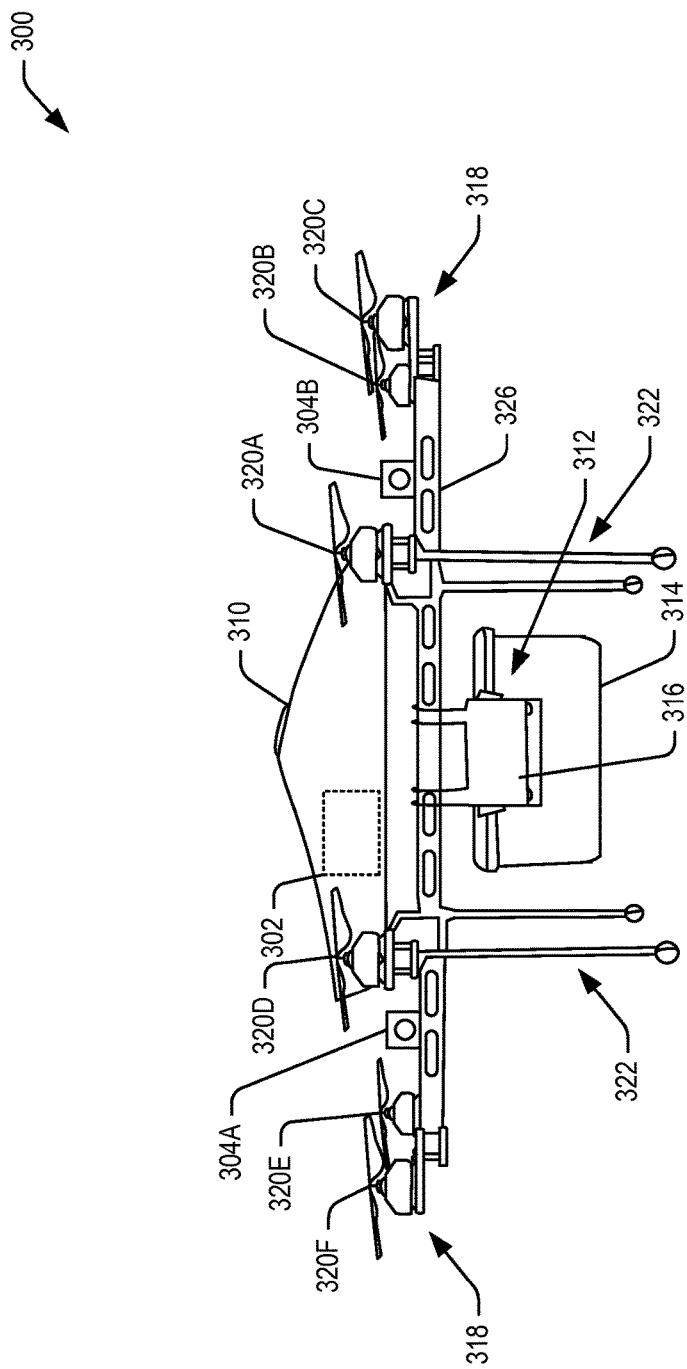
FIG. 3 is a side view of an example vehicle for implementing techniques relating to alignment of stereo cameras as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present specification are directed to, among other things, techniques relating to dynamic alignment of stereo cameras. In particular, techniques described herein relate to the dynamic alignment of stereo cameras by adjusting the position of one or more cameras that make up a stereo camera, adjusting one or more image frames captured by the one or more cameras, and any combination of adjusting positions and adjusting image frames.

In one particular example, a stereo camera, which includes a first camera and a second camera, is attached to a frame of an unmanned aerial vehicle. The stereo camera may be utilized as part of a navigation system of the unmanned aerial vehicle. In order to ensure that the stereo camera provides accurate output (e.g., aligned image frames) to the navigation system, the first camera and the second camera are calibrated and attached to the frame according to an initial calibrated orientation. When the cameras are held in the initial orientation, frames from the first camera and frames from the second camera will be substantially aligned. However, forces acting on the cameras and the frame of the unmanned aerial vehicle may cause the cameras to move out of the initial orientation resulting in inaccurate and low quality output. To measure such movement, a sensing system is provided on the unmanned aerial vehicle. The sensing system may measure movement (e.g., in all three axes and rotation) of the cameras relative to each other. These measurements can then be compared to the initial calibrated orientation to determine how much and in what directions the cameras have moved. In a first example, to account for the movement of the cameras, one or more mechanical adjustments can be made to the positions of the cameras to move them back into the initial calibrated orientation. This can be achieved by instructing actuators that are disposed between the cameras and the frame and attach the cameras to the frame. In a second example, one or more computational adjustments can be made to the image frames themselves. This may include rectifying the image frames such that objects in the image frames are substantially aligned. Irrespective of the type of adjustment, either can be made in almost real-time such that the quality and accuracy of the output does not suffer.

Turning now to the figures, FIG. 1 illustrates an example assembly 100 corresponding to techniques relating to alignment of stereo cameras as described herein. The assembly 100 may include a first camera 102A and a second camera 102B. Each of the first camera 102A and the second camera 102B may be attached to a structure 104 via one or more actuators 106A-106D. In some examples, the structure 104 may be a frame (e.g., a frame of an unmanned aerial vehicle). In some examples, the cameras 102A, 102B may be movably attached to the structure 104 via the one or more actuators 106A-106D. The actuators 106A-106D may be any suitable type of actuator capable of moving the cameras 102A, 102B linearly, translationally, and/or rotationally. To this end, the actuators 106A-106D may include, for example, varieties of piezoelectric actuators (e.g., stack actuators (either discrete or co-fired), strip actuators, screw actuators, modular actuators, chip actuators, any other suitable piezoelectric actuators), varieties of electrostatic actuators, varieties of thermal actuators, varieties of shape-memory alloy actuators, varieties of microelectromechanical systems magnetic actuators, varieties of magnetic actuators, varieties of telescoping actuators (e.g., electrical, hydraulic, pneumatic, or any other suitable type of telescoping actuator). Irrespective of the variety of actuator selected, the actuators 106A-106D may be configured to move the cameras 102A, 102B as instructed by a computing device (e.g., a management device). For example, the management device may instruct the actuator 106C to extend linearly about 50 microns, while the actuator 106B may be instructed to extend linearly less than 50 microns. Thus, in some examples, the actuators 106 may be instructed to adjust the cameras 102A, 102B in terms of microns.

In any event, the first camera 102A and the second camera 102B may together function as a stereo camera. This may be because the first camera 102A and the second camera 102B capture image frame to simulate binocular vision. In some examples, the first camera 102A and the second camera 102B have been previously calibrated to have an initial orientation, depicted by the letter b. The calibration of the cameras 102A, 102B may be performed in any suitable manner. For example, the initial orientation may be determined while the first camera 102A and the second camera 102B are located within a calibration lab using conventional techniques. In any event, the initial orientation may indicate the relative vantage points of the cameras 102A, 102B to each other. Using the initial orientation, a computer may examine relative positions of objects in two image frames captured by the cameras 102A, 102B from their respective vantage points in order to extract three-dimensional information. In this manner, the combination of the first camera 102A and the second camera 102B may be configured to function as a stereo camera to simulate binocular vision. In some examples, binocular vision may be simulated using any suitable combination of lenses (e.g. two lenses) and image sensors, which may include one lens, one sensor, and suitable software and hardware to simulate binocular vision.

In FIG. 1, the assembly 100 is illustrated in two positions, indicated by the encircled A and the encircled B, and referred to herein as position A and position B. Position A may correspond to the initial orientation. When the assembly 100 is in position A, the first camera 102A and the second camera 102B may be aligned, which may enable them to provide output (e.g., image frames that can be used to extract three-dimensional information) that is of suitable quality and accuracy.

In some examples, a force 108 may be exerted on the assembly 100. The force 108 may cause the structure 104 or other components of the assembly 100 to deflect, bend, twist, rotate, vibrate, extend linearly, or contract linearly. In this example, the force 108 was applied vertically down on the structure 104 and caused some rotation and/or deflection in the structure 104, which caused the assembly 100 to move to position B. Position B is illustrated in phantom lines and indicates how components of the assembly 100 have moved. As a result of the force 108 being exerted on the structure 104, the initial orientation b of the first camera 102A and the second camera 102B has changed. The first camera 102A and the second camera 102B are now in an intermediate orientation, designed by b' (b-prime).

Image frames captured by the first camera 102A and the second camera 102B while in the intermediate orientation b' may not be aligned properly. This may result in output that is of unsuitable quality and accuracy. Techniques described herein may be used to measure using a sensing system the difference between the initial orientation and the intermediate orientation, and use those differences to dynamically account for the change in a mechanical manner, as illustrated in FIG. 2.

In some examples, the differences are used to account for the change in a computational manner. For example, respective image frames captured by the cameras 102A, 102B, when in the initial orientation b, may be aligned. However, in some examples, the respective image frames captured by the cameras 102A, 102B when in intermediate orientation b', may not be aligned. Thus, the differences measured by the sensing system may be used to dynamically rectify image frames captured by the cameras 102A, 102B when in the intermediate orientation such that the image frames are aligned. This may include identifying one or more objects in the image frames and aligning the one or more objects based on the initial orientation.

FIG. 2 illustrates the assembly 100 after one or more techniques relating to alignment of stereo cameras as described herein has been performed. In particular, in FIG. 2, the assembly 100 is illustrated with the first camera 102A and the second camera 102B in a rectified orientation, which may be substantially the same as the initial orientation b. In other words, components of the assembly 100 have been adjusted to account for the exerted force 108. These adjustments have returned the first camera 102A and the second camera 102B to substantially the same positions as when the assembly was in position A. In this manner, the first camera 102A and the second camera 102B have been returned to the initial orientation.

In order to return the first camera 102A and the second camera 102B to the initial orientation b, a sensing system (not shown) may be used identify intermediate relative locations of the first camera 102A and the second camera 102B, as illustrated in FIG. 1 position B. The intermediate relative locations may be expressed as sensing information. The initial orientation b may be associated with calibration information that defines initial relative locations of the first camera 102A and the second camera 102B. Using the sensing information and the calibration information, the difference between the initial orientation and the intermediate orientation b' may be determined. This difference can then be used to determine by how much to adjust the cameras 102A, 102B to account for the difference (i.e., to return the cameras 102A, 102B back to the initial orientation b). In the example depicted in FIG. 2, after determining how much the first camera 102A should be moved, the actuators 106A, 106B may be instructed to move the first camera 102A by the determined amount such that the first camera 102A is returned to its initial orientation. Similarly, after determining how much the second camera 102B should be moved, the actuators 106C, 106D may be instructed to move the second camera 102B by the determined amount such that the second camera 102B is returned to its initial orientation. In this example, each of the actuators 106A-106D may move by a different amount to account for the change to the initial orientation b.

FIG. 3 illustrates an example unmanned aerial vehicle (UAV) 300 for implementing techniques relating to alignment of stereo cameras as described herein. The UAV 300 may be designed in accordance with commercial aviation standards and may include multiple redundancies to ensure reliability. For purposes of this specification, the UAV 300 may include a plurality of systems or subsystems operating under the control of, or at least partly under the control of, a management system 324. The management system 324 may include a management device 302 for autonomously or semi-autonomously controlling and managing the UAV 300 and, in some examples, for enabling remote control by a pilot. In some examples, the UAV 300 may include more than one management device 302. For example, a first management device may be configured to manage certain systems of the UAV 300, while a second management device may be configured to manage other systems of the UAV 300.

Portions of the management system 324, including the management device(s) 302, may be housed under top cover 310. As used herein, the management system 324 may be configured to manage aspects of the UAV 300 including, for example, a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., stereo camera assemblies, global positioning system (GPS), inertial navigation system (INS), range finder, Radio Detection And Ranging (RADAR), and other systems to aid in navigating the UAV 300 and detecting objects) (see FIGS. 4 & 5), radio-frequency identification (RFID) capability (not shown), and interfaces capable of speech interpretation and recognition (not shown).

In some examples, the UAV 300 may include a camera 304A and a camera 304B attached to a frame 326. The cameras 304A, 304B are examples of the first camera 102A and the second camera 102B. The operation of the cameras 304A, 304B (and other cameras not shown in this view) may be managed by the management system 324. In some examples, the operation of the cameras 304A, 304B may be managed by the management device 302 or by a management device dedicated to the cameras 304A, 304B. The camera 304A and the camera 304B may together function as a stereo camera and may be part of a stereo camera assembly. As described herein, the UAV 300 may also include other cameras that also function as stereo cameras which may be aligned in other directions in order to aid in navigation of the UAV 300.

As shown in FIG. 3, the UAV 300 may also include a retaining system 312. The retaining system 312 may be configured to retain a payload 314. In some examples, the retaining system 312 may retain the payload 314 using friction, vacuum suction, opposing arms, magnets, and other retaining methods. As illustrated in FIG. 3, the retaining system 312 may include two opposing arms 316 (only one is illustrated) configured to retain the payload 314. The management system 324 may be configured to control at least a portion of the retaining system 312. In some examples, the retaining system 312 may be configured to release the payload 314 in one of a variety of ways. For example, the retaining system 312 (or other system of the UAV 300) may be configured to release the payload 314 with a winch and spool system, by the retaining system 312 releasing the payload, and other methods of releasing the payload. In some examples, the retaining system 312 may operate semi-autonomously or autonomously.

In FIG. 3, the payload 314 is illustrated as a delivery box. In some examples, the delivery box may include one or more packages or items intended for delivery to a recipient. The payload 314, whether as a delivery box or otherwise, may be configured for delivery using a variety of different methods. For example, the payload 314 may include a parachute that opens and slows the payload 314's descent as it falls to its delivery location. In some examples, the payload 314 may include padding surrounding its package to reduce the impact of a drop from the UAV 300 above the ground. The UAV 300 may also deliver the payload 314 by fully landing on the ground and releasing the retaining system 312.

Further, the UAV 300 may include a propulsion system 318. In some examples, the propulsion system 318 may include rotary blades or otherwise be a propeller-based system. As illustrated in FIG. 3, the propulsion system 318 may include a plurality of propulsion devices, a few of which, 320A-320F, are shown in this view. Each propulsion device may include at least one propeller, a motor, wiring, a balance system, a control mechanism, and other features to enable flight. In some examples, the propulsion system 318 may operate at least partially under the control of the management system 324. In some examples, the propulsion system 318 may be configured to adjust itself without receiving instructions from the management system 324. Thus, the propulsion system 318 may operate semi-autonomously or autonomously. The propulsion system 318 may enable multi-directional flight of the UAV 300 (e.g., by adjusting each propeller device individually).

The UAV 300 may also include a landing structure 322. The landing structure 322 may be adequately rigid to support the UAV 300 and the payload 314. The landing structure 322 may include a plurality of elongated legs which may enable the UAV 300 to land on and take off from a variety of different surfaces.

The plurality of systems, subsystems, and structures of the UAV 300 may be connected via the frame 326. The frame 326 may be constructed of a rigid material and be capable of receiving via different connections the variety of systems, sub-systems, and structures. For example, the landing structure 322 may be disposed below the frame 326 and, in some examples, may be formed from the same material and/or same piece of material as the frame 326. The propulsion system 318 may be disposed radially around a perimeter of the frame 326 or otherwise distributed around the frame 326.

Figure 4:
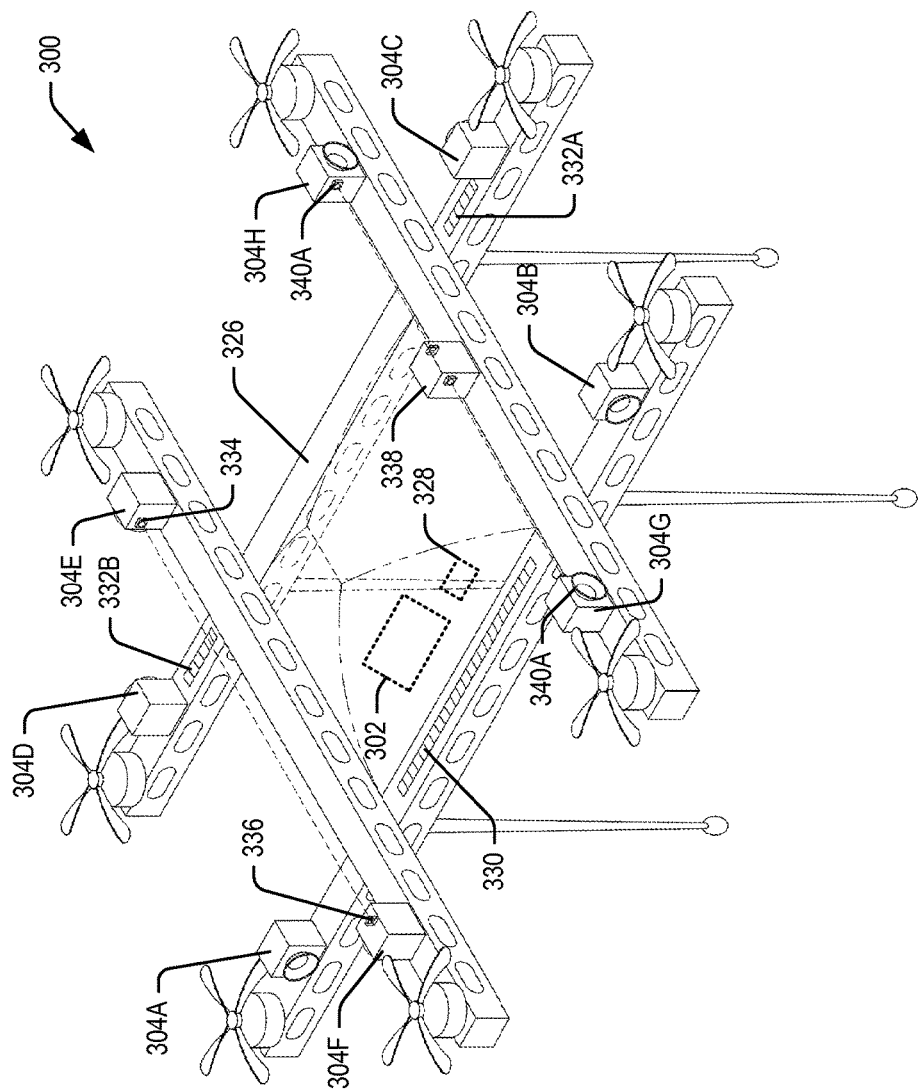
FIG. 4 is a perspective view of an example vehicle for implementing techniques relating to alignment of stereo cameras as described herein, according to at least one example.
Figure 5:
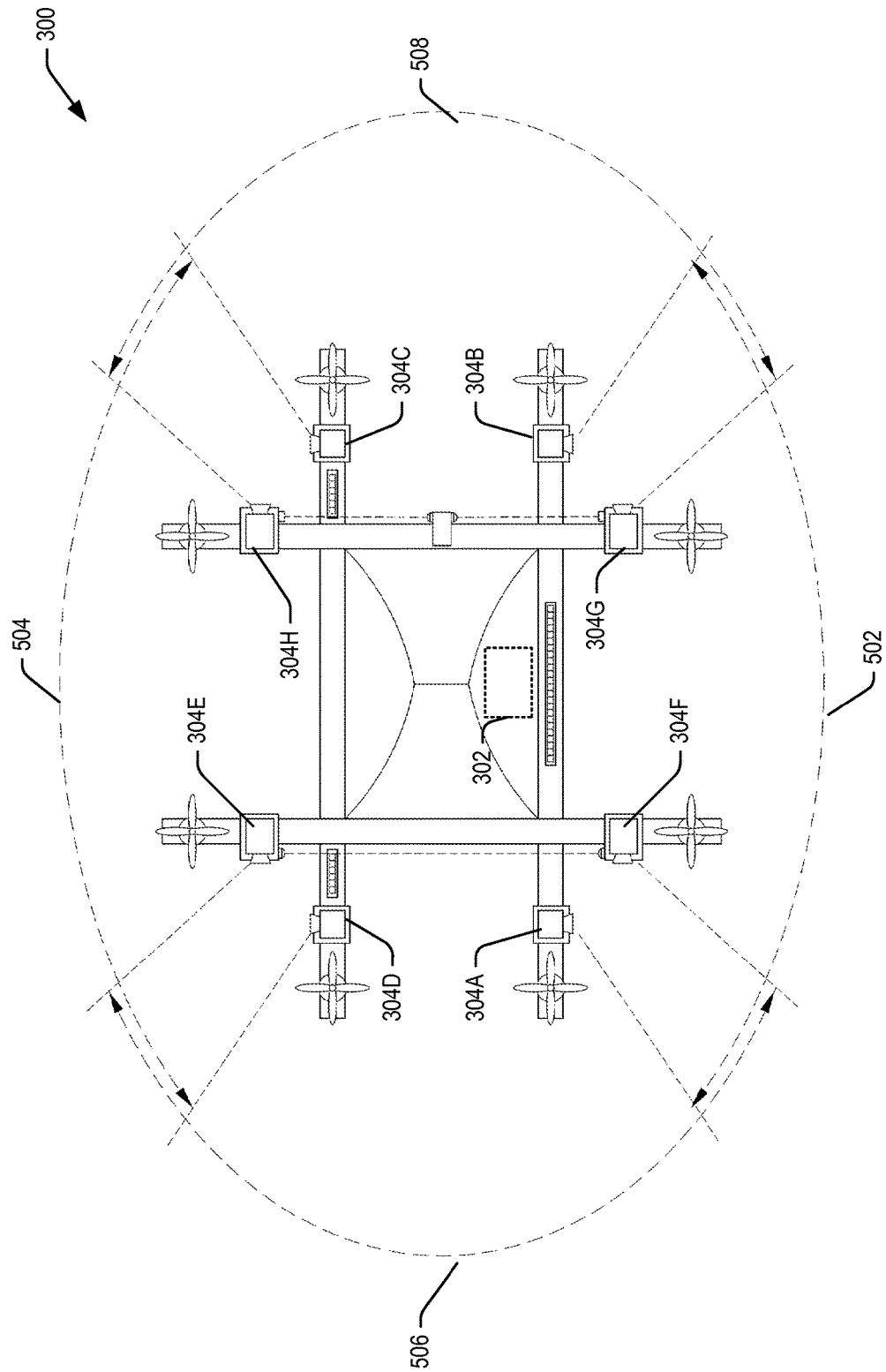
FIG. 5 is a top view of an example vehicle for implementing techniques relating to alignment of stereo cameras as described herein, according to at least one example.

FIG. 4 illustrates a perspective view of the UAV 300 in accordance with at least one example. In the view illustrated in FIG. 4, it may be apparent that the UAV 300 may include a stereo camera assembly that may include a plurality of stereo cameras. In some examples, each of the stereo cameras may include two cameras. For example, the camera 304A and the camera 304B together may make up a first stereo camera, a camera 304C and a camera 304D together may make up a second stereo camera, a camera 304E and a camera 304F together may make up a third stereo camera, and a camera 304G and a camera 304H together may make up a forth stereo camera. In some examples, as also illustrated in FIG. 5, the stereo cameras may be aligned radially around the UAV 300 in order to provide 360 degrees of vision. In this manner, the stereo cameras may provide binocular vision to aid in the navigation of the UAV 300.

Each of the cameras 304A-304H may be any suitable camera capable of capturing image frames. For example, each of the cameras 304A-304H may be a digital video camera, a digital single-lens reflex camera (DSLR), any other suitable camera, and/or any suitable combination of the foregoing. In some examples, each of the cameras 304A-304H may be in communication with the management system 324. In this manner, the management system 324 may manage the operation of the cameras 304A-304H including, for example, receiving still image frames or moving image frames from the cameras 304A-304H to use for navigation or for any other purpose, aligning any of the cameras 304A-304H to account for movement of the frame 326 or the cameras 304A-304H as described herein. Thus, although the cameras 304A-304H are illustrated in FIG. 4 as being fixedly attached to the frame 326, as described herein, the cameras 304A-304H may be movably attached to the frame 326. In some examples, more or fewer cameras may be attached to the frame 326. For example, cameras may be configured to capture image frames in directions other than those illustrated in FIG. 4 (e.g., down and up).

As described with reference to FIGS. 1 and 2, to ensure quality output, each of the stereo cameras may be mounted on the frame 326 in accordance with calibration information. For example, for the first stereo camera, the calibration information may indicate the distance between the camera 304A and the camera 304B when the camera 304A and the camera 304B are attached to the frame 326. This distance may represent a calibrated orientation. Each of the stereo cameras (i.e., pairs of the cameras 304A-304H) may include its own calibrated orientation. In some examples, the calibration information is collected prior to the cameras 304A-304H being attached to the frame 326 (e.g., in a testing environment). In some examples, the calibration information is collected after the cameras 304A-304H have been attached to the frame 326.

As described herein, as the UAV 300 takes off from the ground, flies in the air, and lands on the ground, the calibrated orientations of the cameras 304A-304H may change. This may be a result of the frame 326 twisting, rotating, deflecting, extending, contracting, or otherwise bending. In some examples, the change to the calibrated orientations may be the result of one of the cameras 304A-304H being damaged or loosened from its attachment location on the frame 326. For example, the damage to one of the cameras 304A-304H may result from the UAV 300 crashing. In any event, to measure changes to the calibrated orientations, a sensing system 328 may be provided that is in communication with one or more sensing devices and the management system 324. In some examples, the sensing system 328 is included as part of the management system 324. Thus, the sensing system 328 may include one or more sensing devices in direct communication with the management system 324.

For illustrative purposes, the UAV 300 depicted in FIG. 4 may include four different varieties of sensing devices that may be used in accordance with techniques described herein. Any suitable sensing device capable of measuring position change of a first object (e.g., the camera 304A) and a second object (e.g., the camera 304B) relative to each other may be implemented to perform the techniques described herein. For example, any suitable linear, angular, or multi-axis position sensor, which may be optical, acoustic, electrical, magnetic, or any combination of the foregoing may be used (e.g., capacitive transducer, capacitive displacement sensor, ultrasonic sensor, Hall effect sensor, radar sensor, laser Doppler vibrometer, photodiode array sensor, piezo-electric transducer, potentiometer, proximity sensor, deflection sensor, laser sensor, or any other suitable sensing device).

In some examples, the first stereo camera, including the cameras 304A, 304B, may include a first flex sensing device 330. The first flex sensing device 330 may be configured to measure movement of the frame 326 between the attachment locations of the camera 304A and the camera 304B. Such movement of the frame 326 may affect the relative positions of the camera 304A and the camera 304B. In some examples, the movement may include deflection of the frame which may cause the camera 304A or the camera 304 B to move relative to each other. In some examples, the first flex sensing device 330 may be configured to output sensing information to the management system 324. The sensing information may be used by the management system 324 to determine how the calibrated orientation of the first stereo camera has changed. This may include determining a movement in one or more of three axes and/or rotation.

In some examples, the second stereo camera, including the cameras 304C, 304D, may include a pair of flex sensing devices 332A, 332B. In some examples, the pair of flex sensing devices 332A, 332B may be configured to measure movement of the frame 326 between the attachment locations of the camera 304C and the camera 304D. Thus, similar to the first flex sensing device 330, the pair of flex sensing devices 332A, 332B may detect and measure movement of the camera 304C or the camera 304D to move to relative to each other. In some examples, the pair of flex sensing devices 332A, 332B may be configured to output sensing information to the management system 324. The sensing information may be used by the management system 324 to determine how the calibrated orientation of the second stereo camera has changed. This may include determining a movement in one or more of three axes and/or rotation. The first flex sensing device 330 and the pair of flex sensing devices 332A, 332B may be flex sensors that measure deflection of the frame 326 by measuring electrical resistance changes in the sensing devices as the sensing devices experience the same deflection as the frame 326.

In some examples, the third stereo camera, including the cameras 304E, 304F, may include a first optical sensing device 334 and a first optical reflecting device 336. The first optical sensing device 334 may be attached to the camera 304E and may be in optical communication with the first optical reflecting device 336 which may be attached to the camera 304F. In some examples, the first optical sensing device 334 produces a laser beam (or other light) which is projected towards the first optical reflecting device 336. As the laser beam is reflected away from the first optical reflecting device 336, the first optical sensing device 334 may measure changes in the laser beam to determine movement of the camera 304F and the camera 304E relative to each other. In this manner, the first optical sensing device 334 may be configured to measure movement of the camera 304F and the camera 304E relative to each other. The movement of the camera 304F relative to the camera 304E may be a result of any of the forces discussed herein. In some examples, the first optical sensing device 334 may be configured to output sensing information to the management system 324. The sensing information may be used by the management system 324 to determine how the calibrated orientation of the third stereo camera has changed. This may include determining a movement in one or more of three axes and/or rotation.

In some examples, the fourth stereo camera, including the cameras 304G and 304H, may include a second optical sensing device 338 and corresponding second optical reflecting devices 340A, 340B. In some examples, the second optical sensing device 338 may include two optical sensors corresponding to each of the second optical reflecting devices 340A, 340B. Each of the second optical reflecting devices 340A, 340B may be attached to one of the respective cameras 304G, 304H and may be in optical communication with the optical sensors of the second optical sensing device 338. In this manner, the second optical sensing device 338 may function similar to the first optical sensing device 334 in order to measure movement of the camera 304G and the camera 304H relative to each other. The movement of the camera 304G relative to the camera 304H and the movement of the camera 304H relative to the camera 304 G may be a result of any of the forces discussed herein. In some examples, the second optical sensing device 338 may be configured to output sensing information to the management system 324. The sensing information may be used by the management system 324 to determine how the calibrated orientation of the fourth stereo camera has changed. This may include determining a movement in one or more of three axes and/or rotation. In some examples, sensors other than the optical sensors and/or deflection sensors described herein may be attached to the UAV 300 in accordance with techniques described herein.

FIG. 5 illustrates a top view of the UAV 300 in accordance with at least one example. In the view illustrated in FIG. 5, it may be apparent that the stereo cameras of the UAV 300 may include corresponding fields of vision 504-508. For example, the first stereo camera, including the cameras 304A and 304B, may be configured to provide a first field of vision 502. Similarly, the other stereo cameras may be configured to provide other corresponding fields of vision 504-508. In some examples, each of the fields of vision 502-508 may correspond to the field of vision that the respective stereo camera can capture. In some examples, each of the fields of vision 502-508 may be of roughly the same size (e.g., 120 degrees). In some examples, certain portions of the fields of vision 502-508 may overlap. In some examples, each of the fields of vision 502-508 may be of different sizes, which may be lesser than or greater than 120 degrees. For example, two stereo cameras with fields of vision of about 180 degrees may be used in accordance with the techniques described herein.

Figure 6:
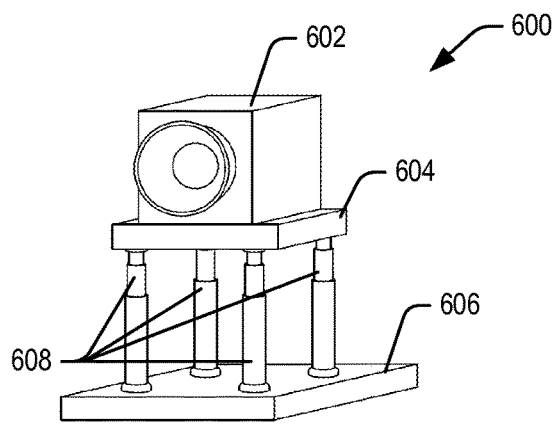
FIGS. 6-8 are example configurations for mounting components of stereo cameras for implementing techniques relating to alignment of stereo cameras as described herein, according to at least one example.

FIG. 6 illustrates a camera mounting assembly 600 in accordance with at least one example. The camera mounting assembly 600 may include a camera 602 attached to a plate 604. In some examples, the camera 602 is an example of the camera 304 described herein. The camera 602 may be attached to a frame 606 via four actuators 608. In some examples, the four actuators 608 are examples of the actuators 106 described herein.

Figure 7:
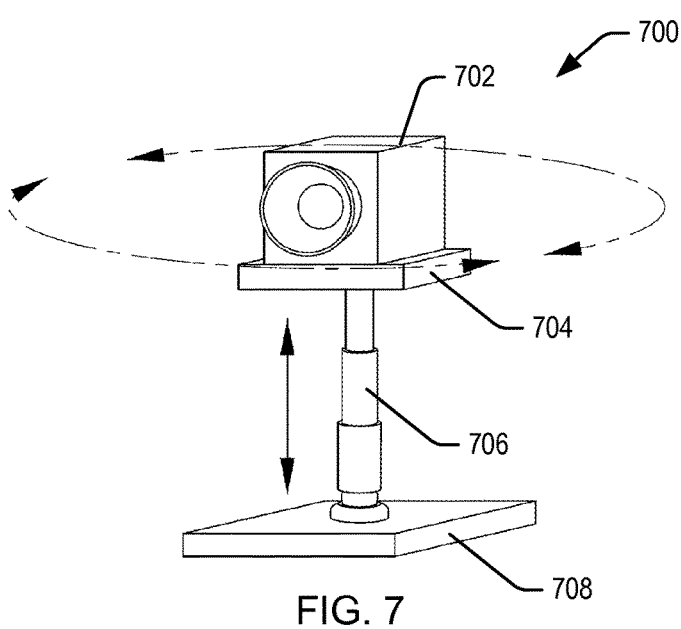

FIG. 7 illustrates a camera mounting assembly 700 in accordance with at least one example. The camera mounting assembly 700 may include a camera 702 attached to a plate 704. In some examples, the camera 602 is an example of the camera 304 described herein. The camera 702 may be attached to a frame 708 via a multi-axis actuator 706. In some examples, the multi-axis actuator 706 may be configured to move in more than one direction. For example, the multi-axis actuator 706 may move the plate 704 and the camera 702 up and down, rotate the camera 702 and the plate 704 about an axis running through the center of the multi-axis actuator 706, and/or pivot about the attachment location on the frame 708. In this manner, the multi-axis actuator 706 may be configured to move the camera 702 and the plate 704 among a plurality of different positions. The multi-axis actuator 706 may have components similar to those discussed with reference to the actuators 608. In some examples, the multi-axis actuator 706 may be configured to move the plate 704 and the camera 702 as instructed by a computing device (e.g., a management device). For example, the management device may determine that the multi-axis actuator 706 move the camera 702 away from the frame 708 by 10 microns, rotate ½ degree about the multi-axis actuator 706, and pivot 1 degree relative to the frame 708. The management system may instruct the multi-axis actuator 706 to move accordingly.

Figure 8:
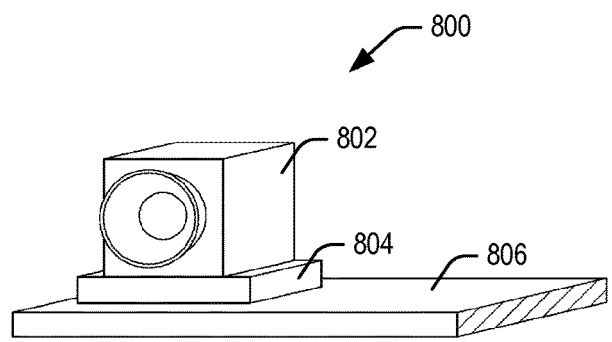

FIG. 8 illustrates a camera mounting assembly 800 in accordance with at least one example. The camera mounting assembly 800 may include a camera 802 attached to a frame 806 via a plate 804. In some examples, the camera 802 is an example of the camera 304 described herein. In some examples, the camera 802 may be attached directly to the frame 806 without the plate 804. In any event, the camera 802 may be fixedly attached to the frame 806 such that the camera 802 may move as the frame 806 moves.

Figure 9:
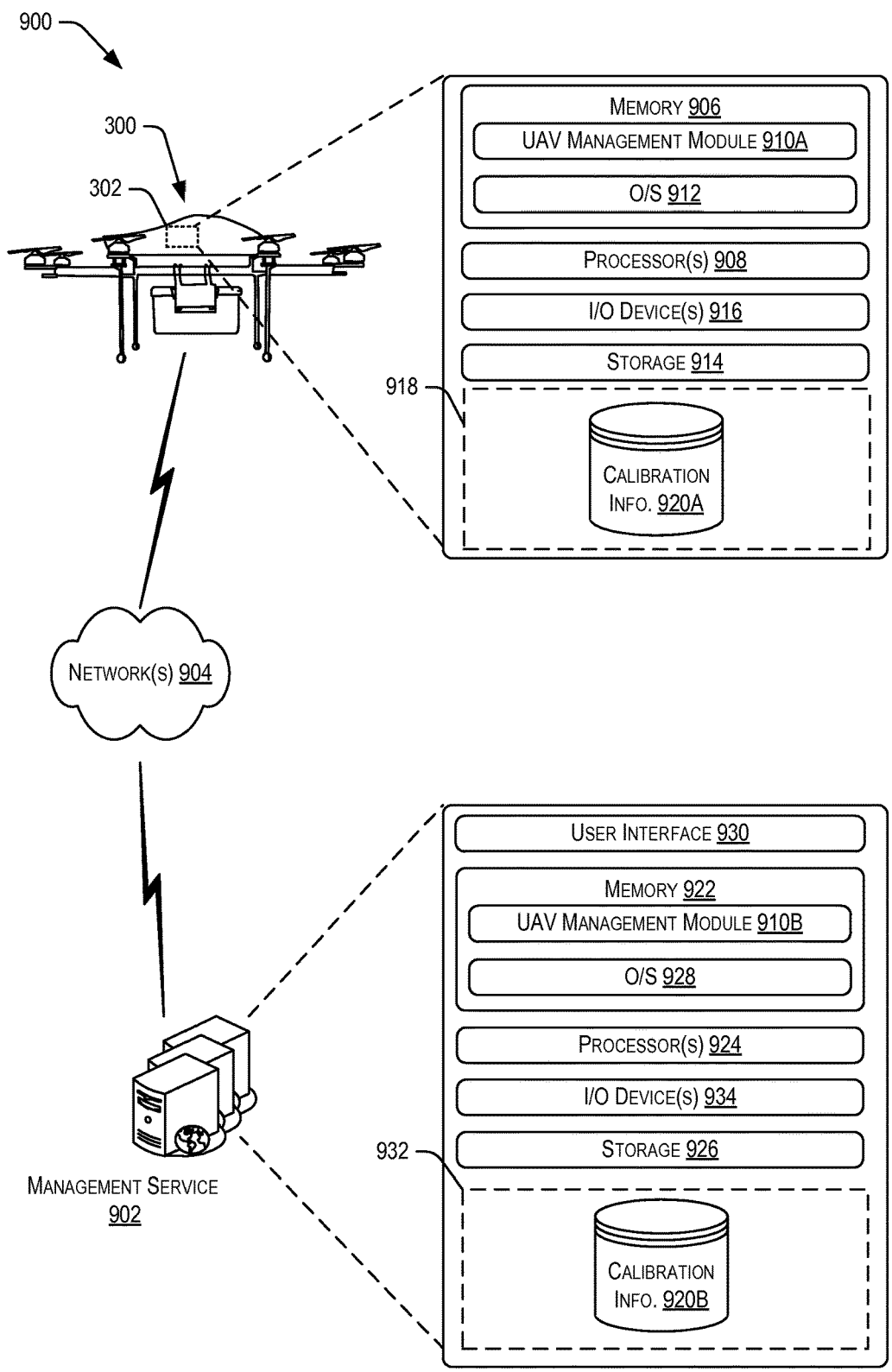
FIG. 9 is an example schematic architecture for implementing techniques relating to alignment of stereo cameras as described herein, according to at least one example.

FIG. 9 illustrates an example schematic architecture 900 for implementing techniques relating to alignment of stereo cameras as described herein, according to at least one example. The architecture 900 may include a management service 902. The management service 902 may be included as part of an electronic marketplace (not shown) and interface with purchase and delivery services of the electronic marketplace. In this manner, the management service 902 may coordinate delivery of items via UAVs, such as the UAV 300, to customers of the electronic marketplace. In some examples, the management service 902 may be a stand-alone service operated on its own or in connection with an electronic marketplace. In either example, the management service 902 may be in communication with the UAV 300 via one or more network(s) 904 (hereinafter, "the network 904"). The network 904 may include any one or a combination of many different types of networks, such as cable networks, the Internet, wireless networks, cellular networks, radio networks, and other private and/or public networks. Thus, the management service 902 may be configured to provide back-end control of the UAV 300 while the UAV 300 navigates. In some examples, the UAV 300 may be configured to navigate with little to no communication with the management service 902.

The UAV 300 may include the management device 302. The management device 302 may be any suitable computing device including at least one memory 906 and one or more processing units (or processor(s)) 908. The processor(s) 908 may be implemented as appropriate in hardware, computer-executable instructions, software, firmware, or combinations thereof. Computer-executable instruction, software, or firmware implementations of the processor(s) 908 may include computer-executable or machine-executable instructions written in any suitable programming language to perform the various functions described. The memory 906 may include more than one memory and may be distributed throughout the management device 302. The memory 906 may store program instructions (e.g., UAV management module 910A) that are loadable and executable on the processor(s) 908, as well as data generated during the execution of these programs. Depending on the configuration and type of memory including the UAV management module 910A, the memory 906 may be volatile (such as random access memory (RAM)) and/or non-volatile (such as read-only memory (ROM), flash memory, or other memory). The management device 302 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 906 may include multiple different types of memory, such as static random access memory (SRAM), dynamic random access memory (DRAM), or ROM. The memory 906 may include an operating system 912 and one or more application programs, modules or services for implementing the features disclosed herein including at least the UAV management module 910A.

In some examples, the management device 302 may also include additional storage 914, which may include removable storage and/or non-removable storage. The additional storage 914 may include, but is not limited to, magnetic storage, optical disks, and/or tape storage. The disk drives and their associated computer-readable media may provide non-volatile storage of computer-readable instructions, data structures, program modules, and other data for the computing devices.

The memory 906 and the additional storage 914, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the management device 302. The modules of the management device 302 may include one or more components. The management device 302 may also include input/output (I/O) device(s) and/or ports 916, such as for enabling connection with a keyboard, a mouse, a pen, a voice input device, a touch input device, a display, speakers, a printer, or other I/O device. The I/O device(s) 916 may enable communication with the other systems of the UAV 300 (e.g., other parts of the control system, power system, communication system, navigation system, propulsion system, and the retaining system). For example, the management device 302 may receive sensing information from the sensing system via one or more of the I/O devices 916.

The management device 302 may also include data store 918. The data store 918 may include one or more databases, data structures, or the like for storing and/or retaining information associated with the UAV 300. In some examples, the data store 918 may include a calibration information database 920A and any other suitable database. Within the calibration information database 920A may be stored calibration information for the various stereo cameras that are attached to the UAV 300.

The management service 902 may include one or more service provider computers, perhaps arranged in a cluster of servers or as a server farm, and may host web service applications. The management service 902 may include an UAV management module 910B stored in at least one memory 922. The UAV management module 910B may include functionality similar to the UAV management module 910A. In this manner, the UAV 300 may operate autonomously, semi-autonomously, or under control of the management service 902.

The management service 902 may include one or more processing units (or processor(s)) 924. The processor(s) 924 may be implemented as appropriate in hardware, computer-executable instructions, software, firmware, or combinations thereof. Computer-executable instruction, software, or firmware implementations of the processor(s) 924 may include computer-executable or machine-executable instructions written in any suitable programming language to perform the various functions described. The memory 922 may include more than one memory and may be distributed throughout the management service 902. The memory 922 may store program instructions (e.g., the UAV management module 910B) that are loadable and executable on the processor(s) 924, as well as data generated during the execution of these programs. Depending on the configuration and type of memory including the UAV management module 910B, the memory 922 may be volatile (such as random access memory (RAM)) and/or non-volatile (such as read-only memory (ROM), flash memory, or other memory). The management service 902 may also include additional removable storage and/or non-removable storage 926 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 922 may include multiple different types of memory, such as static random access memory (SRAM), dynamic random access memory (DRAM), or ROM.

The memory 922 may include an operating system 928 and one or more application programs, modules or services for implementing the features disclosed herein including at least the UAV management module 910B. The UAV management module 910B, in some examples, may function similarly to the UAV management module 910A. For example, when the UAV 300 is in network communication with the management service 902, the UAV 300 may receive at least some instructions from the management service 902 as the UAV management module 910B is executed by the processors 924.

The memory 922 and the additional storage 926, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the UAV management module 910B. The modules of the management service 902 may include one or more components. The management service 902 may also include input/output (I/O) device(s) and/or ports 934, such as for enabling connection with a keyboard, a mouse, a pen, a voice input device, a touch input device, a display, speakers, a printer, or other I/O device.

In some examples, the management service 902 may include a user interface 930. The user interface 930 may be utilized by an operator, or other authorized user to access portions of the management service 902. In some examples, the user interface 930 may include a graphical user interface, web-based applications, programmatic interfaces such as application programming interfaces (APIs), or other user interface configurations.

The management service 902 may also include a data store 932. The data store 932 may include one or more databases, data structures, or the like for storing and/or retaining information associated with the management service 902. The data store 932 may include a calibration information database 920B and any other suitable database. Within the calibration information database 920B may be stored calibration information for the various stereo cameras that are attached to the UAV 300.

Figure 10:
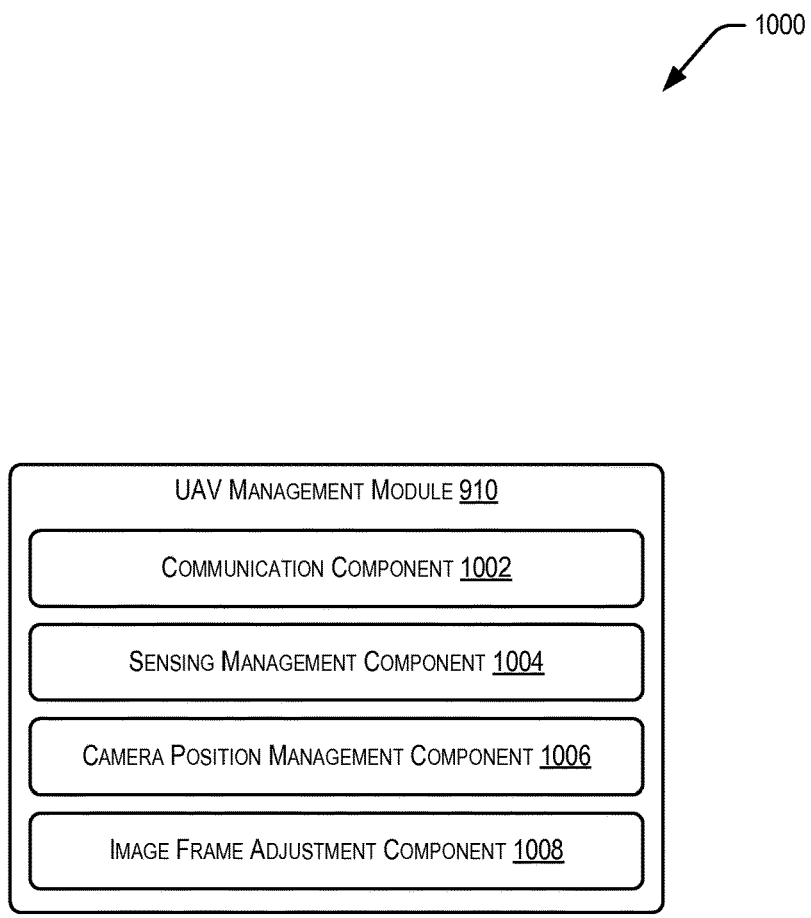
FIG. 10 is an example device for implementing techniques relating to alignment of stereo cameras as described herein, according to at least one example.

FIG. 10 illustrates an example schematic device 1000 including the UAV management module 910. The UAV management module 910 may be configured to manage one or more sub-modules, components, and/or services directed to embodiments disclosed herein. In some examples, the UAV management module 910 may include a communication component 1002, a sensing management component 1004, a camera position management component 1006, and an image frame adjustment component 1008. While these components are illustrated in FIG. 10 and will be described as performing discrete tasks, it is understood that FIG. 10 illustrates example configurations and other configurations performing other tasks and/or similar tasks as those described herein may be implemented according to the techniques described herein. Other modules or components (not shown) may perform the same tasks as the UAV management module 910 or other tasks and may be implemented in a similar fashion or according to other configurations.

Generally, the communication component 1002 may be configured to manage communications between UAVs and a management service, between UAVs and other UAVs, between components of the UAV management module 910, and/or any other communications. For example, the communication component 1002 may be configured to access calibration information from one or more data stores.

The sensing management component 1004 may be configured to manage one or more sensing systems, including one or more sensing devices. Managing the one or more sensing systems may include receiving sensing information from the one or more sensors. In some examples, the sensing management component 1004 is configured to perform one or more operations on the sensing information. For example, the sensing information may be converted or otherwise adjusted prior to being used by the camera position management component 1006 and/or the image frame adjustment component 1008. In some examples, the sensing management component 1004 may be configured to compare the sensing information with the calibration information to determine whether differences exist between the two types of information. In this manner, the sensing management component 1004 may determine whether a calibrated orientation of a stereo camera has changed.

The camera position management component 1006 may be configured to determine one or more position changes to be made to one or more cameras of the UAV 300. For example, the camera position management component 1006 may determine that to restore a stereo camera back to a calibrated orientation, a position of a first camera is to be adjusted along with a position of a second camera. In some examples, the cameras may be adjusted by one or more actuators. In some examples, the cameras may be moved by any other suitable adjusting device.

The image frame adjustment component 1008 may be configured to determine one or more adjustments to be made to one or more image frames outputted from one or more cameras in order to account for positional changes of the one or more cameras. To this end, the image frame adjustment component 1008 may be configured to perform one or more image processing techniques to identify image objects in image frames. Such techniques may include any suitable appearance-based methods (e.g., edge detection, divide-and-conquer, greyscale matching, gradient matching, histograms of receptive field responses, model-based techniques, etc.), feature-based methods (e.g., interpretation trees, hypothesis tests, pose consistency, pose clustering, invariance, geometric hashing, scale-invariant feature transform, speeded up robust features, etc.), and any other suitable technique for identifying image objects in images (e.g., frames of content items). Once objects have been identified, the image frame adjustment component 1008 may perform one or more image processing techniques to rectify the image frames. In some examples, this may include rotating, twisting, stretching, shrinking, or otherwise adjusting the image frames such that objects of the frame are aligned. In some examples, this may include planar rectification, cylindrical rectification, or polar rectification.

Figure 11:
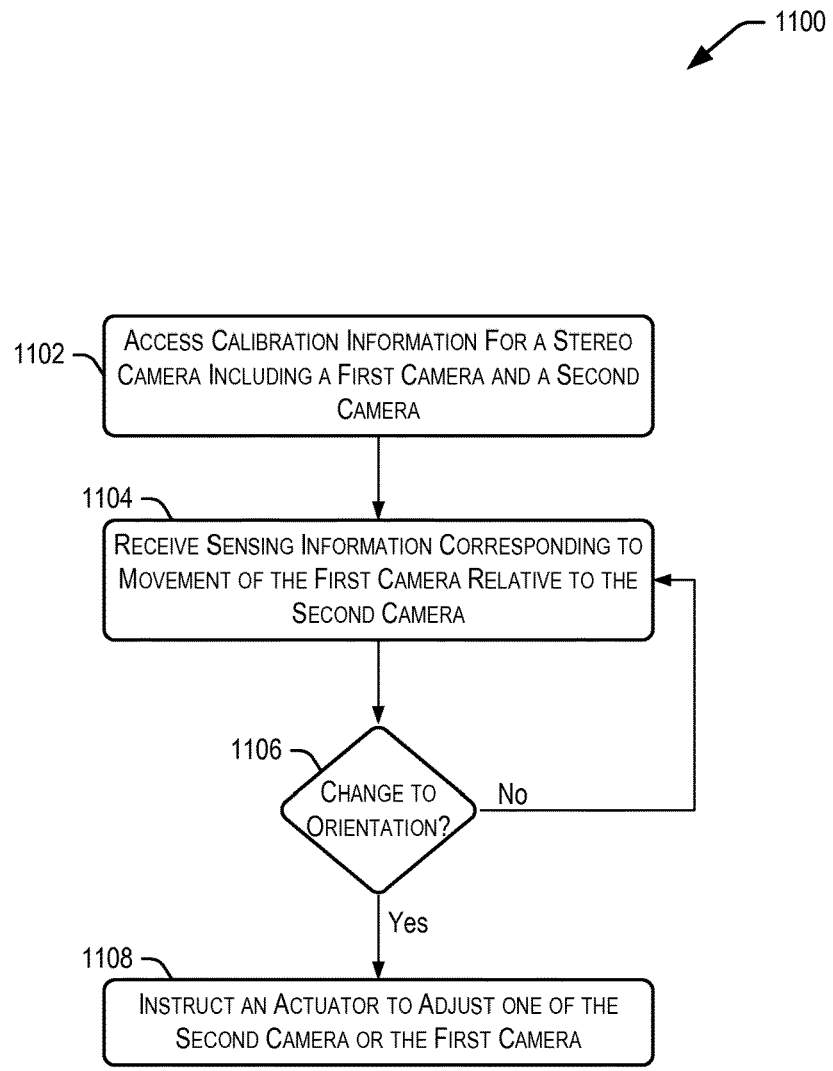
FIG. 11 is a flow diagram depicting example acts for implementing techniques relating to alignment of stereo cameras as described herein, according to at least one example.
Figure 12:
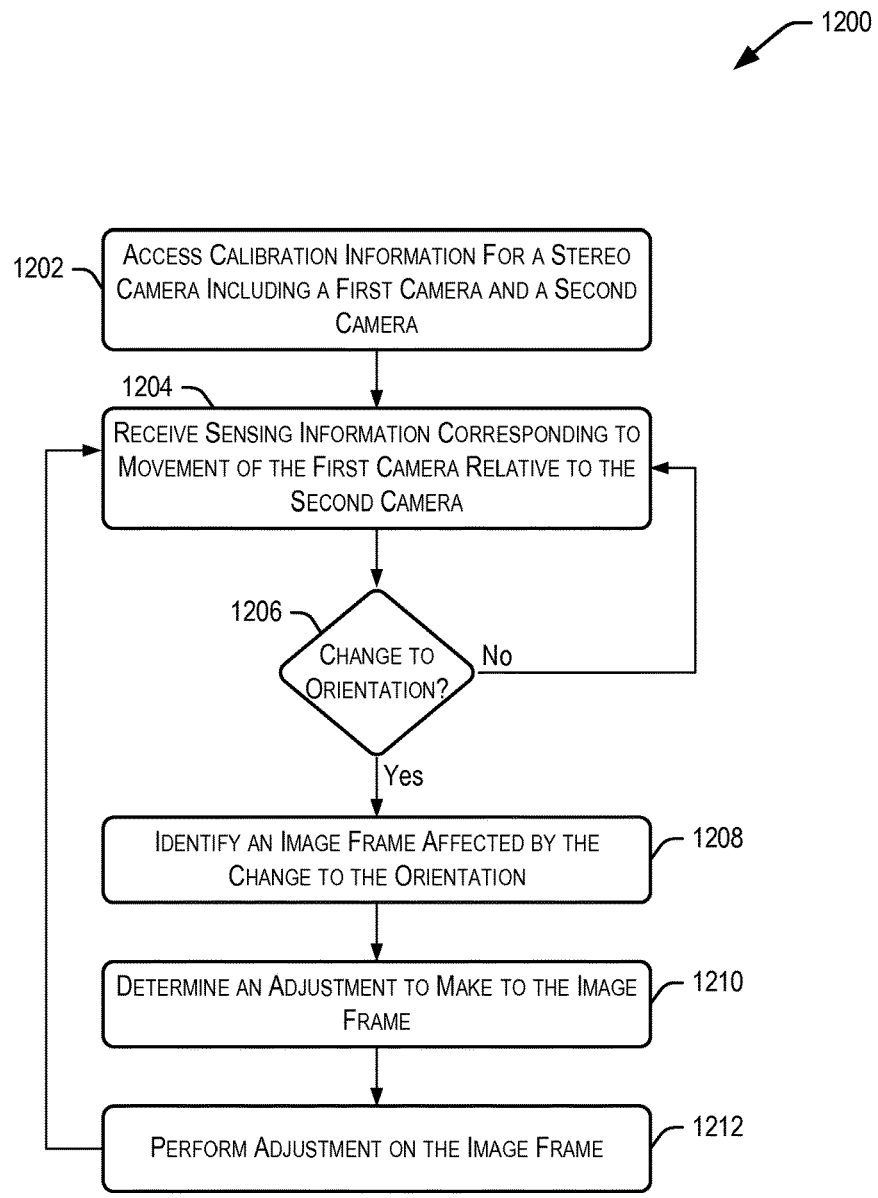
FIG. 12 is a flow diagram depicting example acts for implementing techniques relating to alignment of stereo cameras as described herein, according to at least one example.

FIGS. 11 and 12 illustrate example flow diagrams showing respective processes 1100 and 1200, as described herein. These processes 1100 and 1200 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 11 depicts the process 1100 including example acts or techniques relating to alignment of stereo cameras in accordance with at least one example. The UAV management module 910 (FIG. 9), whether embodied in the management device 302 (FIG. 3) or the management service 902 (FIG. 9), may perform the process 1100 of FIG. 11. The process 1100 begins at 1102 by accessing calibration information for a stereo camera including a first camera and a second camera. In some examples, accessing the calibration information may be performed by the communication component 1002 (FIG. 10). Accessing the calibration information may include accessing information that indicates a positional relationship between the first camera and the second camera. In some examples, the calibration information may identify a calibrated or initial orientation of the stereo camera. The calibrated orientation may be the orientation of the first camera and the second camera relative to each other and according to which the first camera and the second camera can capture image frames of suitable accuracy for simulating binocular vision. In some examples, the first camera and the second camera may be attached to a frame according to the calibrated orientation. In some examples, the calibration information may identify the alignment of the first camera relative to the second camera in terms of X, Y, and Z axes and rotation. In some examples, the calibration information may be retained in a calibration information database. The calibration information may be generated prior to installation of the stereo camera and/or after installation of the stereo camera.

At 1104, the process 1100 receives sensing information corresponding to movement of the first camera or the second camera relative to each other. In some examples, receiving the sensing information may be performed by the sensing management component 1004 (FIG. 10). Receiving the sensing information may include receiving the sensing information from one or more sensing systems including one or more sensing devices. In some examples, the sensing information may identify relative movement of the first camera and the second camera. In some examples, the sensing information may not directly identify the relative movement of the first camera and the second camera, but may instead identify the movement of certain objects that affects the relative positions of the first camera and the second camera. For example, the sensing information may indicate changes to a frame to which cameras are attached. In some examples, the sensing information may be used to identify one of the cameras that has been moved in a way that can be corrected for. For example, if one of the cameras were damaged or had become loose, the sensing information may indicate a larger measurement compared to a camera that has been subjected to deflection. When the larger measurement is identified, the process 1100 may determine whether the UAV is capable of navigating given the damage. The process 1100 may also inform the navigation system of the damage.

At 1106, the process 1100 determines whether an orientation of the stereo camera has changed. In some examples, determining whether the orientation of the stereo camera has changed may be performed by the sensing management component 1004. Determining whether orientation of the stereo camera has changed may include comparing a portion of the calibration information with a portion of the sensing information to determine whether one of the first camera or the second camera has moved relative to one another. In some examples, the relative movement or movement of one camera is considered a change to the orientation when the relative movement or the movement of one of the cameras exceeds one or more thresholds. For example, it may be that a certain minimal amount of movement may be tolerated. However, when the movement exceeds the certain minimal amount, it may be determined that the orientation has changed. In some examples, determining whether the orientation of the stereo camera has changed may include calculating positional changes of the first camera relative and the second camera relative to each other.

If the answer at 1106 is NO, the process 1100 returns to 1104 where the process 1100 receives the sensing information. If the answer at 1106 is YES, the process 1100 proceeds to 1108, where the process 1100 instructs an actuator to adjust one of the second camera or the first camera. In some examples, instructing the actuator may be performed by the camera position management component 1006 (FIG. 10). Instructing the actuator may include instructing one or more actuators. In some examples, instructing the actuator may include providing instructions to a computing device configured to control the actuator, and the computing device instructing the actuator to adjust one of the cameras. In some examples, instructing the actuator may include instructing the actuator to adjust a position of one of the second camera or the first camera. For example, adjusting the position may include moving one of the second camera or the first camera such that the cameras are aligned according to an initial orientation. In some examples, such alignment may enable binocular vision of suitable quality and accuracy. In some examples, the process 1100 may be performed in about real-time. This may enable adjustment of the cameras in an uninterrupted manner (e.g., in a manner that the management device can rely on the video being outputted by the stereo camera for navigational purposes).

FIG. 12 depicts the process 1200 including example acts or techniques relating to alignment of stereo cameras in accordance with at least one example. The UAV management module 910 (FIG. 9), whether embodied in the management device 302 (FIG. 3) or the management service 902 (FIG. 9), may perform the process 1200 of FIG. 12. The process 1200 begins at 1202 by accessing calibration information for a stereo camera including a first camera and a second camera. In some examples, accessing the calibration information may be performed by the communication component 1002 (FIG. 10). Accessing the calibration information may include accessing information that indicates a positional relationship between the first camera and the second camera. In some examples, the calibration information may identify a calibrated or initial orientation of the stereo camera. The calibrated orientation may be the orientation of the first camera and the second camera relative to each other and according to which the first camera and the second camera can capture image frames of suitable accuracy for simulating binocular vision. In some examples, the first camera and the second camera may be attached to a frame according to the calibrated orientation. In some examples, the calibration information may identify the alignment of the first camera and the second camera relative to each other in terms of X, Y, and Z axes and rotation. In some examples, the calibration information may be retained in a calibration information database. The calibration information may be generated prior to installation of the stereo camera and/or after installation of the stereo camera.

At 1204, the process 1200 receives sensing information corresponding to movement of the first camera or the second camera relative to each other. In some examples, receiving the sensing information may be performed by the sensing management component 1004 (FIG. 10). Receiving the sensing information may include receiving the sensing information from one or more sensing systems including one or more sensing devices. In some examples, the sensing information may identify relative movement of the first camera and the second camera. In some examples, the sensing information may not directly identify the relative movement of the first camera and the second camera, but may instead identify the movement of certain objects that affects the relative positions of the first camera and the second camera.

At 1206, the process 1200 determines whether an orientation of the stereo camera has changed. In some examples, determining whether the orientation of the stereo camera has changed may be performed by the sensing management component 1106. Determining whether orientation of the stereo camera has changed may include comparing a portion of the calibration information with a portion of the sensing information to determine whether one of the first camera or the second camera has moved relative to one another. In some examples, the relative movement or movement of one camera is considered a change to the orientation when the relative movement or the movement of one of the cameras exceeds one or more thresholds. For example, it may be that a certain minimal amount of movement may be tolerated. However, when the movement exceeds the certain minimal amount, it may be determined that the orientation has changed. In some examples, determining whether the orientation of the stereo camera has changed may include calculating positional changes of the first camera relative to the second camera.

If the answer at 1206 is NO, the process 1200 returns to 1204 where the process 1200 receives the sensing information. If the answer at 1206 is YES, the process 1200 proceeds to 1208 where the process 1200 identifies an image frame affected by the change to the orientation. In some examples, identifying the image frame affected may be performed by the image frame adjustment component 1008 (FIG. 10). Identifying the image frame affected may include identifying a plurality of image frames affected. In some examples, an effected image frame is an image frame that is captured by one of the first camera or the second camera when the first camera or the second camera is not in the calibrated orientation. Because an effected image frame may be out of alignment, outputted video including the image frame may be of poor quality or poor accuracy. In some examples, identifying the image frame affected may include identifying one or more objects in the image frame, and detecting differences between the positions of the one or more objects within frames of the first camera compared to frames of the second camera. In some examples, identifying the image frame affected is based on the received sensing information. For example, the sensing information may indicate that one of the first camera or the second camera has moved, and identifying the image frame affected includes identifying an image frame captured at about the same time that the first camera or the second camera moved. In this manner, identifying the image frame affected may be associated with a time the frame was captured and a time that the camera used to capture the frame moved.

At 1210, the process 1200 determines an adjustment to make to the image frame. In some examples, determining the adjustment to make to the image frame may be performed by the image frame adjustment component 1008. Determining the adjustment may include analyzing a portion of the calibration information and a portion of the sensing information to estimate the extent of the movement of images in the image frame compared to other image frames. For example, at 1210 it may be determined that a first object in the image frame may be in a first position in the calibrated orientation, but after the calibrated orientation has changed, the first object may be in a second position. The determined adjustment may be sufficient to adjust the image frame such that the first object is returned to the first position. In some examples, determining adjustments to make to the image frame includes determining a plurality of adjustments to one or more image frames.

At 1212, the process 1200 performs the adjustment on the image frame. In some examples, performing the adjustment on the image frame may be performed by the image frame adjustment component 1008. Performing the adjustment may include adjusting the frame such that the positions of one or more objects in the frame are returned to positions associated with the calibrated orientation. In some examples, performing the adjustment may include performing one or more image rectification techniques as described herein.

Figure 13:
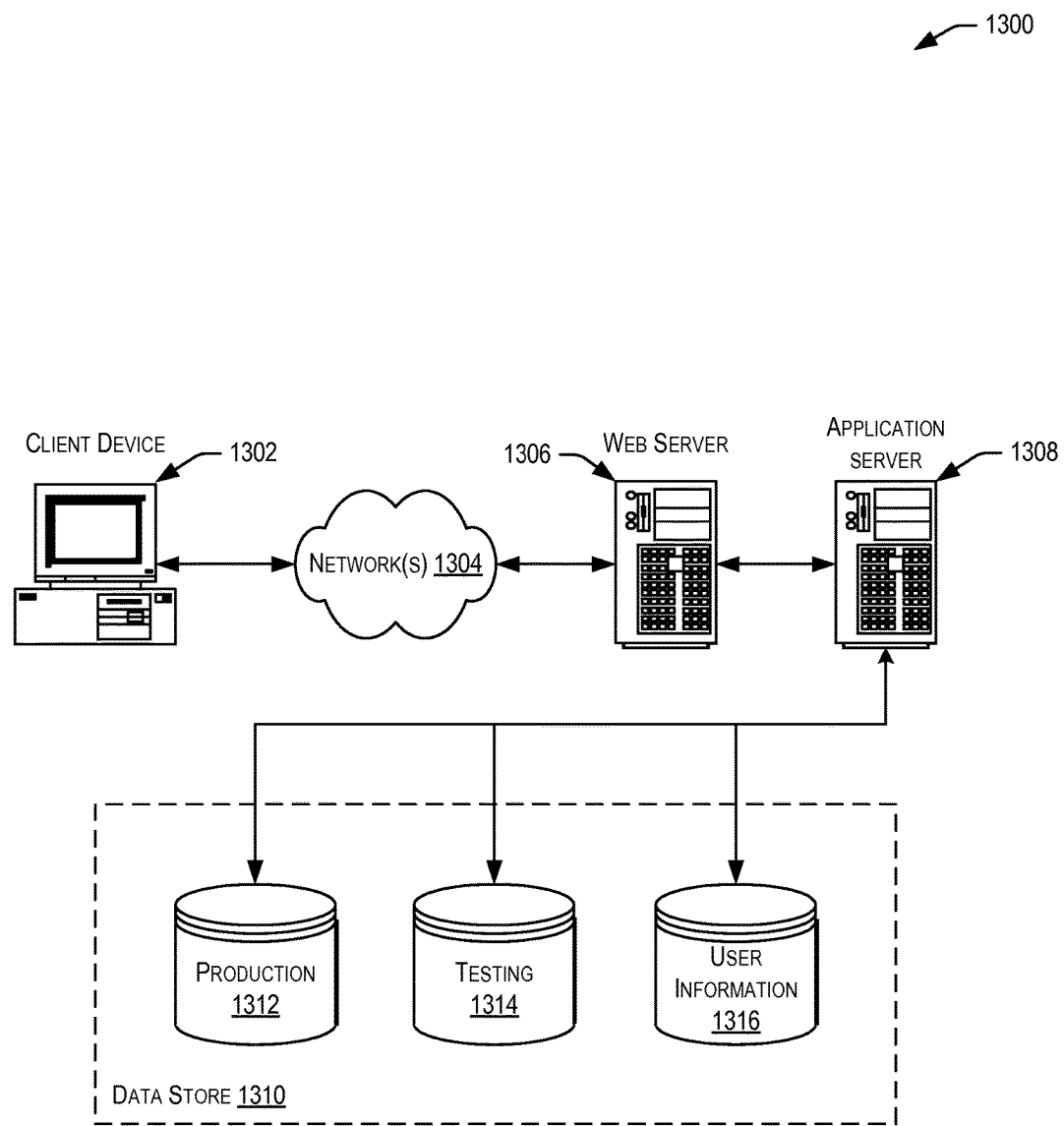
FIG. 13 is an example schematic environment for implementing techniques relating to alignment of stereo cameras as described herein, according to at least one example.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of Hyper Text Markup Language ("HTML"), Extensible Markup Language ("XML") or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An unmanned aerial vehicle, comprising:
   a frame;
   a propulsion system comprising at least one propeller, the propulsion system connected to the frame;
   a stereo camera array comprising:
      a first camera connected to the frame and configured to capture a plurality of first image frames; and
      a second camera connected to the frame via an actuator that extends between an exterior body of the second camera and the frame, the second camera configured to capture a plurality of second image frames;
   a sensing system connected to the frame and external from the first camera and the second camera and in communication with a management device, the sensing system comprising:
      an optical sensor device connected to the frame at a location between the first camera and the second camera, the optical sensor device configured to produce a first light at a first side of the optical sensor device and a second light at a second side of the optical sensor device, the optical sensor device comprising:
         a first optical sensor disposed at the first side of the optical sensor device; and
         a second optical sensor disposed at the second side of the optical sensor device;
      a first reflecting device attached to the first camera and in optical communication with the optical sensor device, the first side of the optical sensor device oriented in a first direction toward the first reflecting device, the first reflecting device positioned to produce a first reflection from the first light; and
      a second reflecting device attached to the second camera and in optical communication with the optical sensor device, the second side of the optical sensor device oriented in a second direction toward the second reflecting device, and the first direction being different from the second direction, the second reflecting device positioned to produce a second reflection from the second light;
   the management device configured with at least a memory and a processor configured to:
      access calibration information for the stereo camera array, the calibration information at least indicating a calibrated orientation for the first camera relative to the second camera;
      receive, via the sensing system, position information that indicates at least one of the first camera or the second camera has changed position, the position information based at least in part on the first reflection and the second reflection, and the sensing system sensing at least a portion of the position information when the unmanned aerial vehicle is being moved by the at least one propeller of the propulsion system;
      identify a change to the calibrated orientation of the first camera relative to the second camera based at least in part on the position information; and
      instruct the actuator to at least displace the second camera at least until the first camera and the second camera are returned to the calibrated orientation.

2. The unmanned aerial vehicle of claim 1, wherein the change to the calibrated orientation is caused at least in part by one or more of vibration, deflection, linear extension, linear contraction, or twisting.

3. The unmanned aerial vehicle of claim 1, wherein the actuator comprises a piezoelectric linear actuator, and wherein instructing the actuator to at least displace the second camera into the calibrated orientation comprises providing an electrical signal to the piezoelectric linear actuator that causes a portion of the piezoelectric linear actuator to move the second camera from a first position to a second position, the second camera in the calibrated orientation when at the second position.

4. The unmanned aerial vehicle of claim 1, wherein the first camera is connected to the frame via a second actuator, the management device further configured to, in response to identifying the change to the calibrated orientation, instruct the second actuator to at least displace the first camera at least until the first camera and the second camera are returned to the calibrated orientation.

5. The unmanned aerial vehicle of claim 1, wherein the optical sensor device further comprises at least one of a laser sensor, a photoelectric sensor, or a depth sensor.

6. A vehicle, comprising:
a frame;
at least one stereo camera configured to output image data, comprising:
　a first camera connected to the frame via at least one actuator that extends between an exterior body of first camera and the frame, the first camera being oriented in a first orientation; and
　a second camera connected to the frame and oriented in a second orientation;
at least one sensing device connected to the frame at a location between the first camera and the second camera, the at least one sensing device configured to produce a first light at a first side of the at least one sensing device and a second light at a second side of the at least one sensing device, the at least one sensing device comprising:
　a first optical sensor disposed at the first side of the at least one sensing device; and
　a second optical sensor disposed at the second side of the at least one sensing device;
　a first reflecting device attached to the first camera and in optical communication with the at least one sensing device, the first side of the at least one sensing device oriented in a first direction toward the first reflecting device, the first reflecting device positioned to produce a first reflection from the first light; and
　a second reflecting device attached to the second camera and in optical communication with the at least one sensing device, the second side of the at least one sensing device oriented in a second direction toward the second reflecting device, and the first direction being different from the second direction, the second reflecting device positioned to produce a second reflection from the second light; and
a management device configured with at least a memory and a processor configured to:
　access calibration information for the at least one stereo camera, the calibration information at least indicating a calibration relationship between the first orientation and the second orientation;
　receive, via the at least one sensing device, position information that indicates at least one of the first camera or the second camera has changed position, the position information being distinct from the image data and being based at least in part on the first reflection and the second reflection;
　determine, based at least in part on the position information, a change in a relative orientation corresponding to a change in at least one of the first orientation or the second orientation;
　determine that the change in the relative orientation exceeds a predetermined threshold; and
　perform, based at least in part on determining that the change in the relative orientation exceeds the predetermined threshold, one or more adjustments to at least one of the first camera or the second camera to restore the calibration relationship between the first orientation and the second orientation.

7. The vehicle of claim 6, wherein performing the one or more adjustments comprises instructing the at least one actuator to move the first camera from a first position to a second position, the first camera, when in the second position, being substantially aligned with the first orientation.

8. The vehicle of claim 6, wherein performing the one or more adjustments to at least one of the first camera or the second camera further comprises:
　identifying an object in a first image frame captured by the first camera at a first time, the object located at a first position in the first image frame at the first time;
　identifying the object in a second image frame captured by the second camera at the first time, the object located at a second position in the second image frame at the first time, the first position distinct from the second position; and
　adjusting, based at least in part on the position information and the calibration information, the first image frame such that the object in the first image frame is substantially aligned with the object in the second image frame.

9. The vehicle of claim 8, wherein the vehicle comprises a navigation system, and wherein the management device is further configured to provide the one or more adjustments to the navigation system.

10. The vehicle of claim 6, further comprising a propulsion system including at least one propeller, and wherein at least a portion of the position information is received when the vehicle is being moved by the at least one propeller of the propulsion system.

11. The vehicle of claim 6, wherein the at least one sensing device further comprises at least one of a laser sensor, a photoelectric sensor, a depth sensor, an acoustic sensor, or a flex sensor.

12. The vehicle of claim 6, wherein the one or more adjustments comprise at least one of rotation of the first camera relative to the second camera or translation of the first camera relative to the second camera.

13. The vehicle of claim 6, wherein the calibration relationship corresponds to a calibrated orientation for the at least one stereo camera, and wherein first image frames captured by the first camera are substantially aligned with second image frames captured by the second camera when the at least one stereo camera is aligned according to the calibrated orientation.

14. A computer-implemented method, comprising:
　accessing calibration information for a stereo camera array of an unmanned aerial vehicle, the stereo camera array comprising a first camera and a second camera, the first camera configured to capture a first plurality of image frames, the second camera configured to capture a second plurality of image frames, and the calibration information at least indicating an initial orientation of the first camera relative to the second camera, image frames of the first plurality of image frames aligned with other image frames of the second plurality of image frames when the stereo camera array is oriented according to the initial orientation;
　receiving, via a sensing system connected to a frame of an unmanned aerial vehicle, position information, the sensing system comprising:
　　an optical sensor device connected to the frame at a location between the first camera and the second camera, the optical sensor device configured to produce a first light at a first side of the optical sensor device and a second light at a second side of the optical sensor device, the optical sensor device comprising:
  a first optical sensor disposed at the first side of the optical sensor device; and
  a second optical sensor disposed at the second side of the optical sensor device;
a first reflecting device attached to the first camera and in optical communication with the optical sensor device, the first side of the optical sensor device oriented in a first direction toward the first reflecting device, the first reflecting device positioned to produce a first reflection from the first light, the first reflection corresponding to the position information; and
a second reflecting device attached to the second camera and in optical communication with the optical sensor device, the second side of the optical sensor device oriented in a second direction toward the second reflecting device, and the first direction being different from the second direction, the second reflecting device positioned to produce a second reflection from the second light, the second reflection corresponding to the position information;
determining a change to a position of the first camera or the second camera based at least in part on the position information;
identifying a misalignment of at least one image frame of the first plurality of image frames or the second plurality of image frames based at least in part on the change to the position of the first camera or the second camera;
determining that the change to the position of the first camera or the second camera exceeds a predetermined threshold;
determining an adjustment for the at least one image frame, based on at least the determination that the change to the position of the first camera or the second camera exceeds the predetermined threshold, to account for the misalignment; and
performing the adjustment on the at least one image frame.

15. The computer-implemented method of claim 14, wherein the at least one image frame was captured by the first camera at a first time, and wherein identifying the at least one image frame comprises:
  identifying an object located at a first position at the first time in the at least one image frame; and
  identifying the object at a second position at the first time in a second image frame captured by the second camera, the first position distinct from the second position.

16. The computer-implemented method of claim 15, wherein performing the adjustment on the at least one image frame comprises adjusting, based at least in part on the sensing information and the calibration information, the at least one image frame such that the object in the at least one image frame is substantially aligned with the object in the second image frame.

17. The computer-implemented method of claim 14, wherein the at least one image frame is captured by the first camera, and wherein performing the adjustment on the at least one image frame comprises one or more of:
  performing planar rectification of the at least one image frame relative to a second image frame captured by the second camera;
  performing cylindrical rectification of the at least one image frame relative to the second image frame; or
  performing polar rectification of the at least one image frame relative to the second image frame.

18. The unmanned aerial vehicle of claim 1, wherein:
the actuator is one of a plurality of actuators by which the second camera is connected to the frame; and
instructing the actuator to at least displace the second camera comprises instructing the plurality of actuators to displace the second camera into the calibrated orientation by adjusting a position of the second camera in at least two dimensions.

19. The unmanned aerial vehicle of claim 1, wherein the first direction is opposite the second direction.

* * * * *